United States Patent [19]

Matich

[11] Patent Number: 5,082,208

[45] Date of Patent: Jan. 21, 1992

[54] SYSTEM AND METHOD FOR CONTROLLING AN AIRCRAFT FLIGHT CONTROL MEMBER

[75] Inventor: Charles B. Matich, Seattle, Wash.

[73] Assignee: The Boeing Company, Seattle, Wash.

[21] Appl. No.: 415,193

[22] Filed: Sep. 29, 1989

[51] Int. Cl.⁵ .............................................. B64C 3/40
[52] U.S. Cl. ...................................... 244/78; 91/378; 91/381; 244/194; 244/227
[58] Field of Search .................... 244/76 R, 75 R, 78, 244/226, 227, 230, 231, 194; 91/378, 381, 360; 475/1, 31, 32, 56; 137/655.69

[56] References Cited

U.S. PATENT DOCUMENTS

| | | | |
|---|---|---|---|
| 1,696,836 | 12/1928 | Bushyager | 475/1 |
| 2,503,447 | 4/1950 | May | 91/378 |
| 2,628,594 | 2/1953 | Teaque et al. | 91/378 |
| 2,721,714 | 10/1955 | Clifton | 244/226 |
| 3,013,539 | 12/1961 | Rethmeier | |
| 3,203,176 | 8/1965 | Zeek | |
| 3,253,613 | 5/1966 | Richolt | |
| 3,359,818 | 12/1967 | Deverell et al. | 244/231 |
| 3,587,394 | 6/1971 | Hillbrands | 91/378 |
| 3,613,504 | 10/1971 | Krause | |
| 3,679,156 | 7/1972 | Redmond, Jr. | |
| 3,695,295 | 10/1972 | Olsen et al. | |
| 3,892,164 | 7/1975 | Magor | 91/378 |
| 3,985,156 | 10/1976 | Walker | |
| 4,779,512 | 10/1988 | Leonard | 91/378 |

Primary Examiner—Galen Barefoot
Attorney, Agent, or Firm—Hughes & Multer

[57] ABSTRACT

A control system and method for controlling a flight control member employs a hydraulic control valve which is responsive to input from the pilot in a manner to start and stop a hydraulic motor which in turn starts and stops movement of the control member so that the control member assumes the desired flight control position. The control valve comprises a valve housing means, a first valve element and a second valve element wherein the first valve element moves from an initial position thereof relative to the valve housing to a selected new position in a manner to open a selected port means to cause fluid to flow to a hydraulic drive means and also to establish a selected feedback displacement quantity, which is a quantity by which the second valve element is to be displaced from an initial position thereof relative to the valve housing in a manner that when the second valve element is displaced by the feedback displacement quantity to the new position, the second valve element closes a selected port means to interrupt fluid flow to the hydraulic drive means. The second valve control means is responsive to feedback from the flight control member. The system and method also uses a planetary gear transmission which provides for a drive input from the hydraulic drive, a second drive input from a backup drive motor, and rotational feedback to the control valve.

30 Claims, 9 Drawing Sheets

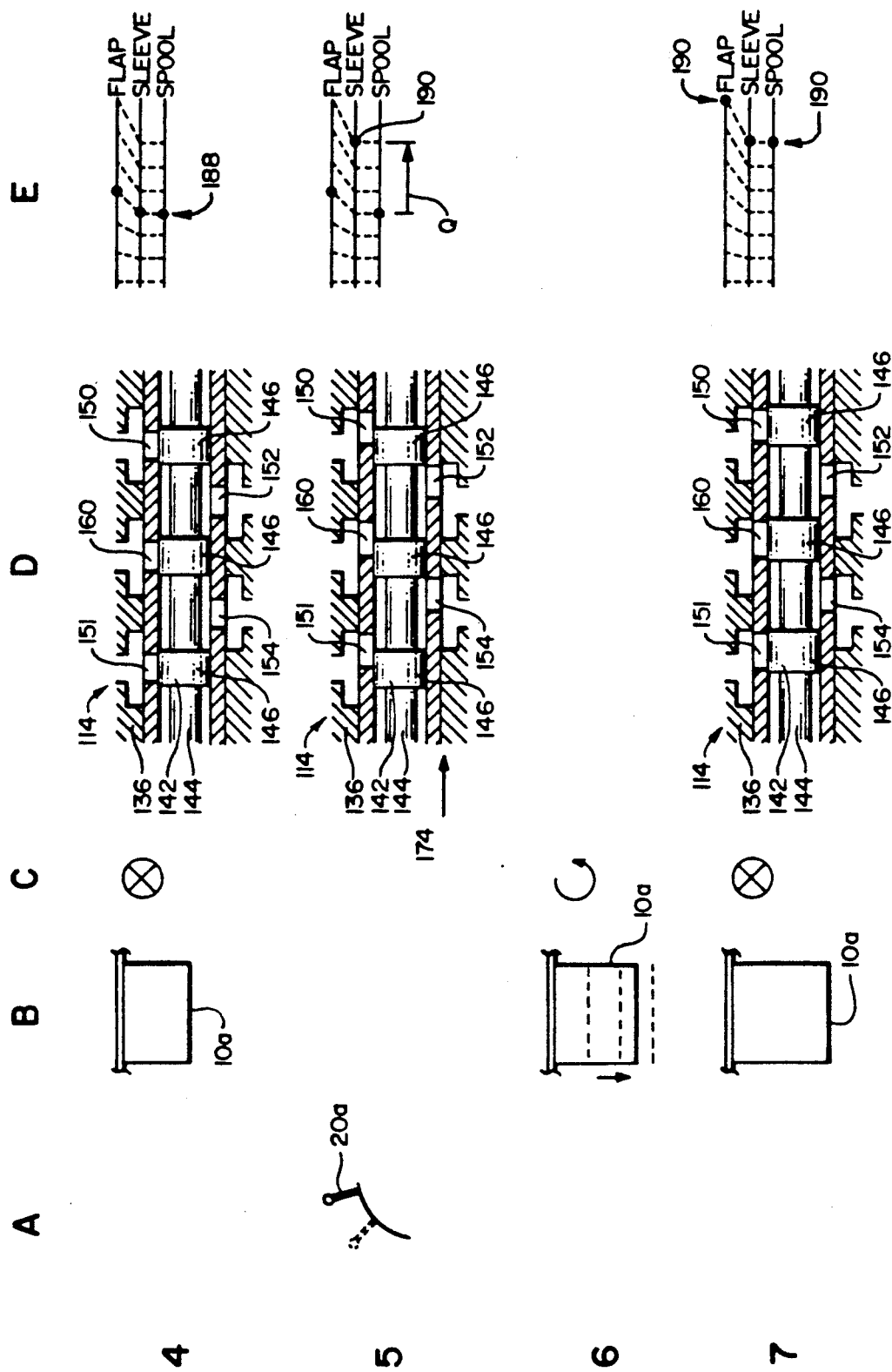

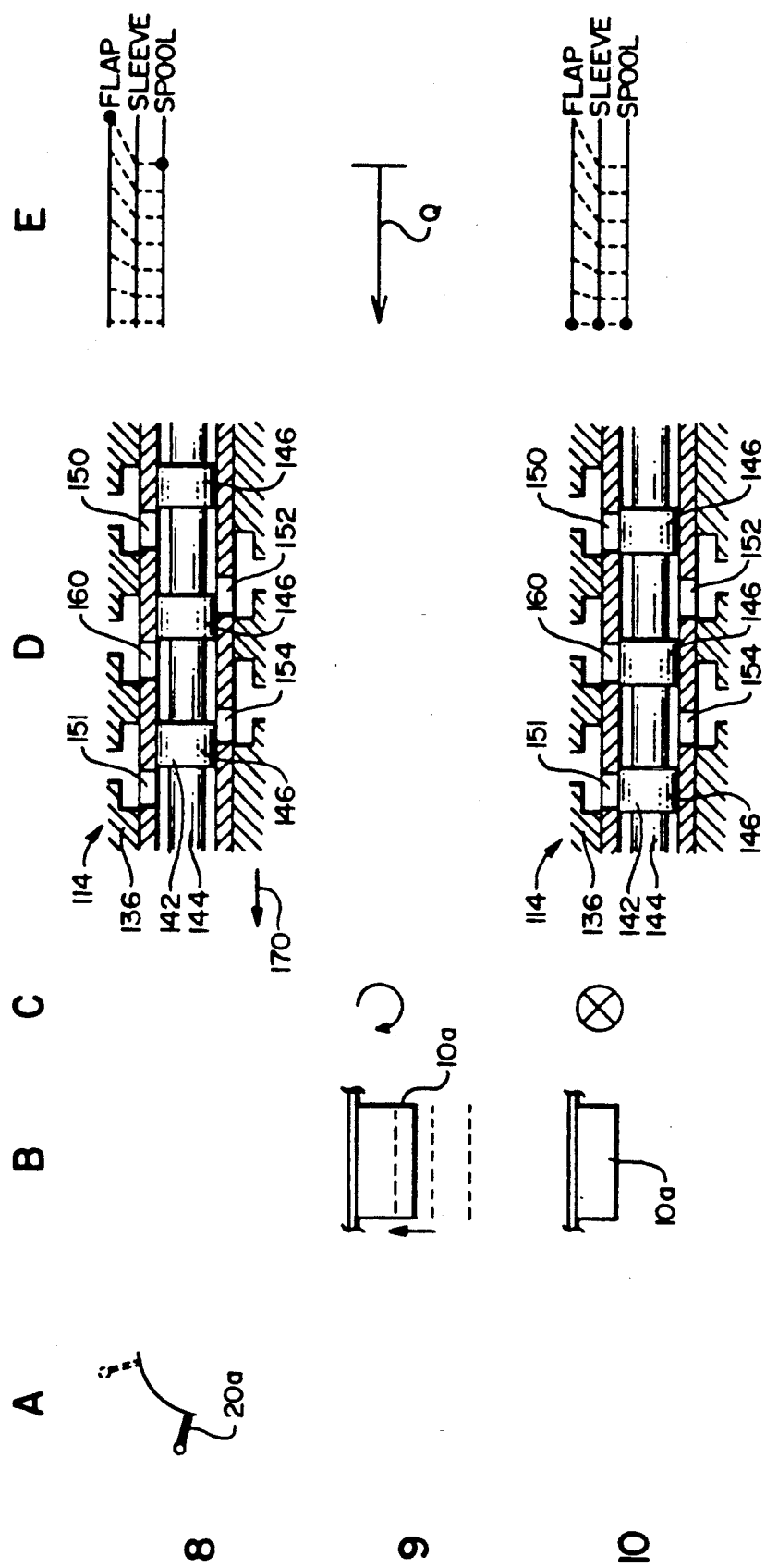

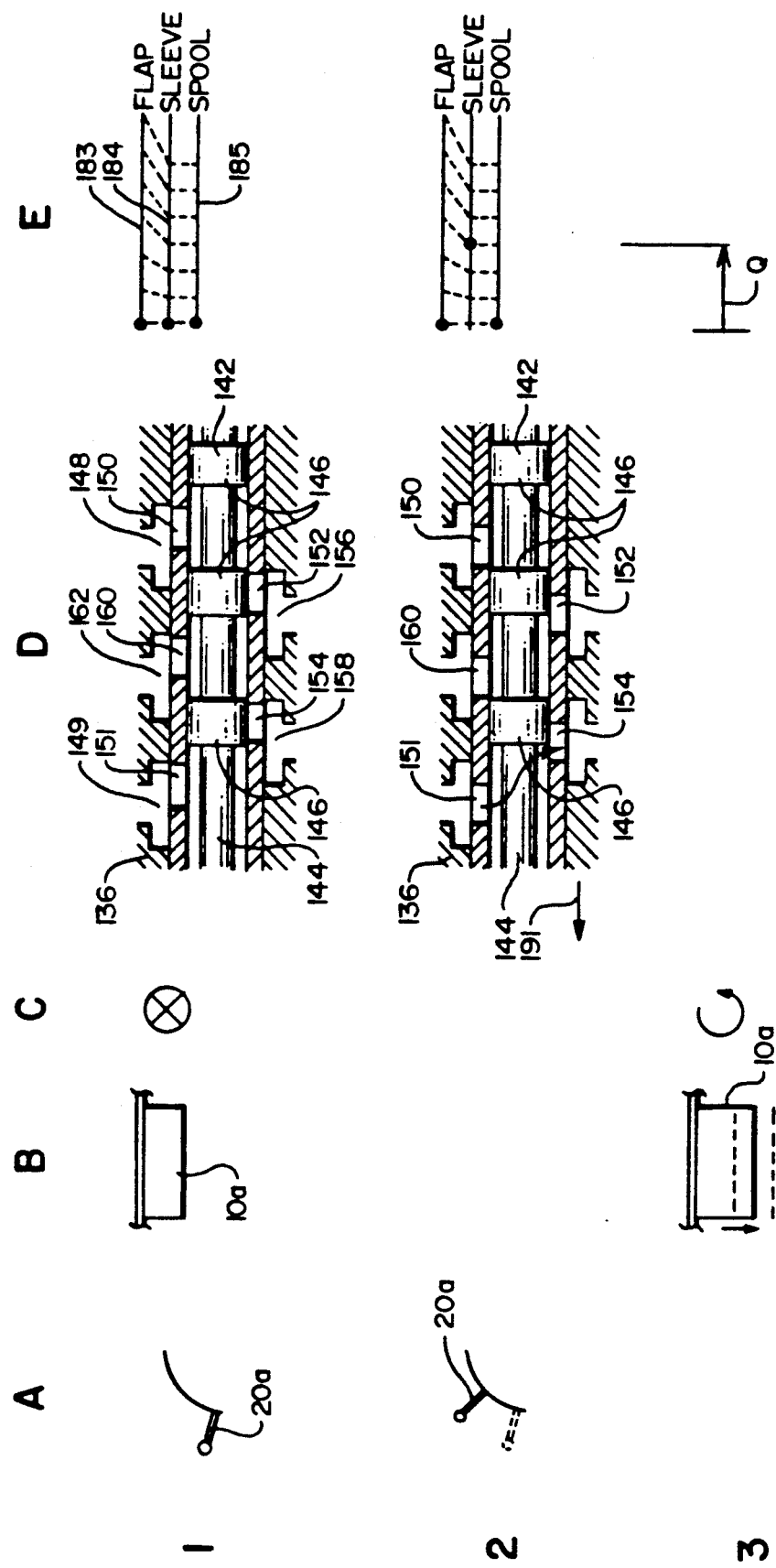

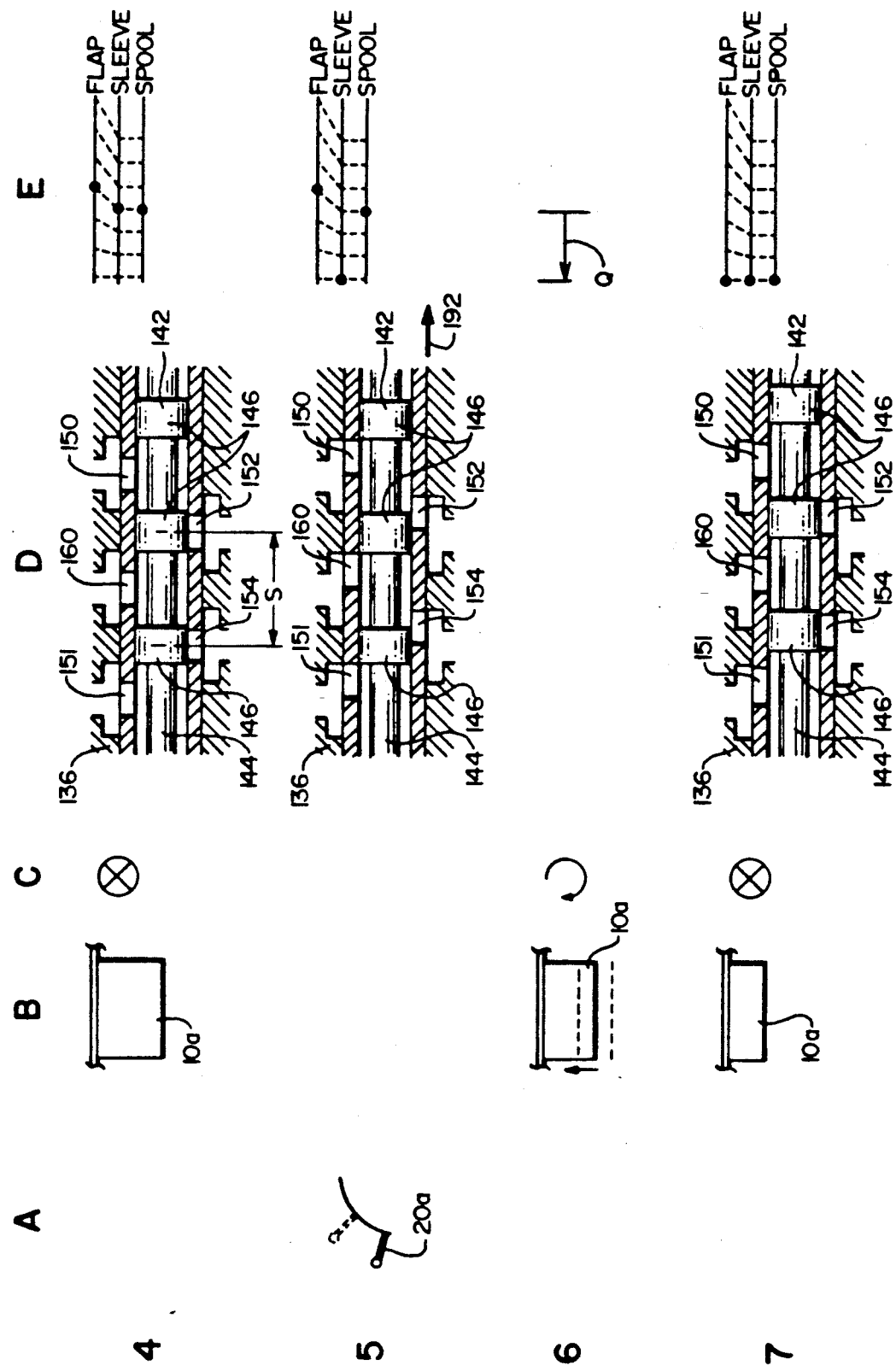

SYSTEM AND METHOD FOR CONTROLLING AN AIRCRAFT FLIGHT CONTROL MEMBER

BACKGROUND OF THE INVENTION

1. Field of the Invention

The present invention relates generally to onboard aircraft flight control systems, and more particularly to such control systems used in positioning an aircraft flight control member or flap in various control positions.

2. Background Art

Onboard control systems are known for positioning an aircraft flight control member, such as a trailing edge flap, which typically comprise a hydraulic motor which, via a drive transmission, displaces the flap. The transmission often includes a torque tube, the rotation of which in turn extends or retracts the flap. A flow of hydraulic fluid to the motor is controlled by a control logic, which starts and stops the flow so as to turn the motor an appropriate number of revolutions so as to move the flap to the desired flap position.

There desirably is a reliable feedback mechanism, which senses and feeds the actual position and movement of the flap or flight control member back to the control system so that the hydraulic motor will displace the flight control member by the appropriate distance. When the pilot commands an onboard flight computer to execute a particular movement of the flight control surface, and the computer translates this command into an input, that input desirably sets in motion an appropriate opening of a hydraulic control valve, which controls the hydraulic motor, and desirably brings about the necessary feedback.

One conventional control system, which is used in present day Boeing 747-400 aircraft and which will be discussed in more detail in the description of the invention and accompanying FIG. 1 provides a mechanical input and feedback logic apparatus which receives a mechanical input from an input motor and which receives a mechanical feedback from the flap.

A search of the U.S. patent literature has developed the following patents:

In U.S. Pat. No. 3,083,622 (Werts) there is shown a control system which regulates a rate of fuel flow to an engine. There is a computer 90, which is a valve that has a plurality of concentric, ported sleeves positioned within one another. The individual sleeves are rotated or slid along an axis in response to various feedback parameters such as a throttle, an engine speed, a temperature, and a compressor pressure. The ports of the sleeves overlap to allow the fuel to pass. Examples, shown in FIG. 2, include a sleeve 260, which rotates in response to a speed feedback and which has a port 298, and a sleeve 270, which is turned by a movement of a throttle arm 106 and which has a port 300, wherein the ports 298 and 300 overlap. Movement of the sleeves and ports varies an area through which fuel may flow, thereby regulating a fuel control pressure Px'. The control pressure Px' in turn, by operating a separate servovalve, determines a direct fuel flow to the jet engine. As explained in Col. 6 lines 20–36 and Col. 7 lines 17–28, an increase (decrease) of the control pressure Px' results in an increase (decrease) in an amount of fuel ultimately delivered to the engine.

U.S. Pat. No. 3,695,295 (Olsen et al) shows a hydraulic control valve at the core of which is a spool valve which has as single spool element 12. A rotary input through an input shaft 26 is converted by a cam mechanism called a translator 25 into a lateral movement of the spool 12. A feedback shaft 28 rotates the spool 12 from the other end of the spool 12 while the cam in the translator 25 is held fixed. The feedback rotation causes the spool 12 to move laterally and to return to its earlier position.

U.S. Pat. No. 3,985,156 (Walker) shows a gas and liquid flow control valve which is manually operated and which has concentric channels (i.e., an inner channel, through which a liquid flows, and a concentric outer channel, through which a gas flows). The operator is able to control the flow of the liquid and of the gas independently.

U.S. Pat. No. 3,679,156 (Redmond, Jr.) shows a fly-by-wire flap control system which employs triple redundancy in its electrical control components to provide reliability. The system converts three independent electrical control signals via an arrangement of transducers and a summing linkage into a single mechanical movement of a rod 44. The movement of the rod 44 activates two servo-pumps 50 and 52 which control a power actuator 60 which in turn drives a flap 82.

U.S. Pat. No. 3,613,504 (Krause) shows concentric valve elements which are arranged concentrically in order to provide a backup element in case one of the other valve elements jams or seizes.

U.S. Pat. No. 3,253,613 (Richolt) shows side-by-side spool valves in a bore in a control valve. One spool valve is a backup for the other one.

U.S. Pat. No. 3,203,176 (Zeek) shows a governor for metering fuel to a gas turbine engine. This device uses a spool moveable within a sleeve, both of which are moveable within a bore, in order to provide two simultaneous inputs to the valve so that the valve is able to respond to the dual inputs. There is the spool 46 which is slideably mounted in the central bore in the sleeve 33. This sleeve 33 contains several ports, and the sleeve 33 and the spool 46 cooperate to respond to two speed settings which are communicated to the valve mechanically.

U.S. Pat. No. 3,013,539 (Rethmeier) shows a quick acting reversing valve which controls the movements of a piston in a hydraulic cylinder. The valve uses concentric valve elements 22 and 25 which are mounted for slideable movement relative to a valve body and to each other. An arrangement of various ports, chambers and channels in the valve elements 22 and 25 enables the device to perform a predetermined cyclical movement which in turn controls a cyclical action of the hydraulic cylinder.

SUMMARY OF THE INVENTION

A control system to selectively cause an aircraft flight control member to assume various flight control positions comprises: a hydraulic drive means to move said flight control member to said flight control positions; a control valve means operatively connected to a source of hydraulic fluid and to the hydraulic drive means to selectively direct the hydraulic fluid thereto, with the control valve means comprising a valve housing means, a first valve element, moveable relative to the valve housing, and a second valve element moveable relative to the valve housing, with the first and second valve elements being moveable relative to one another; a first valve control means to move the first valve element relative to the valve housing; an input means to cause the first valve control means to move the first valve element to selected positions of the first valve element relative to the valve housing; a second valve control means to move the second valve element relative to the valve housing and relative to the first valve element; and a sensing and feedback means.

The first valve element moves from an initial position thereof relative to the valve housing to a selected new position in a manner to open a selected port means to cause fluid to flow to the hydraulic drive means and also to establish a selected feedback displacement quantity, which is a quantity by which the second valve element is to be displaced from an initial position thereof relative to the valve housing in a manner that when the second valve element is displaced by the feedback displacement quantity to a new position, the second valve element closes a selected port means to interrupt fluid flow to the hydraulic drive means. The system is characterized in that the first valve positions correspond to respective selected positions of the flight control member. The sensing and feedback means is responsive to an input which is related to a displacement of the flight control member in a manner to sense the member displacement and to cause the second valve control means to displace the second valve element relative to the valve housing by a function of the member displacement, whereby the hydraulic drive means moves the flight control member by an amount needed so that the flight control member assumes the selected flight control positions.

The system further comprises a transmission means operatively connected to displace the flight control member and a secondary drive means which is responsive to a secondary command directed at selectively causing the flight control member to assume the flight control positions. The hydraulic drive means and the secondary drive means, respectively, are continuously engaged driveably with, respectively, a primary drive input means and a secondary drive input means of the transmission means.

The valve housing means has stationary port means which comprise stationary source port means connected to the source of hydraulic fluid and stationary control port means connected to the hydraulic drive means, with the stationary port means being connected to a stationary chamber of the valve housing means. The first valve element moves within the stationary chamber between the first valve positions along an alignment axis of the stationary chamber. Also, the first valve element has port means which are connected to a chamber of the first valve element and which allow the fluid to pass between the stationary source port means and the first valve chamber and between the first valve chamber and the stationary control port means, whereby the fluid is allowed to flow via the first valve chamber between the source and the hydraulic drive means.

The second valve element comprises spool means for stopping the flow of fluid through the first valve chamber, wherein the second valve element moves within the first valve chamber between the second valve positions along the alignment axis to selectively open and close the first valve port means. Accordingly, when the first valve element is selectively displaced in a manner to be displaced from the initial position thereof and relative to the second valve element, the port means is opened to allow the flow of fluid; when the second valve element is displaced from the initial position thereof by the feedback displacement quantity, the port means is closed.

The first valve control means causes the first valve element to move axially in response to a rotational input from rotation of a component of the input means. The second valve control means causes the second valve element to move axially in response to a rotational feedback from rotation of the sensing and feedback means, wherein the first valve control means has a central opening wherein a connecting means connects the second valve control means to the second valve element through the opening.

The first valve control means comprises: an input wheel means to which is imparted the rotational input; a first rotatable thread means; a first axially moveable thread means, which is threadably engaged with the first rotatable thread means and connected to drive the first valve element axially; and a first anti-rotation means. The first rotatable thread means is fixedly attached to the input wheel means, with the rotatable thread means and the input wheel means being rotatably mounted about an input rotation axis. The first anti-rotation means is connected to the first axially moveable thread means so as to cause the first axially moveable thread means to move axially along the input rotation axis when the first rotatable thread means is rotated, so as to drive the first valve element along the alignment axis.

The second valve control means comprises: a feedback wheel means to which is imparted the rotational feedback; a second rotatable thread means; a second axially moveable thread means which is threadably engaged with the second rotatable thread means; and a second anti-rotation means. The second rotatable thread means is fixedly attached to the feedback wheel means, with the second rotatable thread means and the feedback wheel means being mounted for rotation about a feedback rotation axis. The second anti-rotation means is operatively connected to the second axially moveable thread means so as to cause the second axially moveable thread means to move along the feedback rotation axis when the second rotatable thread means rotates. The second axially moveable thread means is connected to the second valve element so as to drive the second valve element axially along the alignment axis.

The transmission means comprises a planetary gear means, and a motor output wheel means, which is driven by the hydraulic drive means. The planetary gear means comprises: a ring wheel means, which is rotated by a rotation of the motor output wheel means; a plurality of planet wheel means, which are surrounded by the ring wheel means; and a sun wheel means, around which the planet wheel means revolve. A rotation of the ring wheel means causes the planet wheel means to revolve around the sun wheel means, which revolution acts to move the flight control member to the flight control positions, with a rotation of the ring wheel means acting to provide the rotational feedback to the second valve control means.

A control system to selectively cause an aircraft flight control member to assume various flight control positions comprises: a transmission means operatively connected to the flight control member to move the flight control member to the flight control positions; a first drive means which is responsive to a first command directed at selectively causing the flight control member to assume the flight control positions; and a second drive means which is responsive to a second command directed at selectively causing the flight control member to assume the flight control positions. The first drive means and the second drive means, respectively, are continuously engaged, respectively, with the first drive input means and the second drive input means. The first drive input means causes the transmission means to move the flight control member to the selected flight control positions when the second drive input means is substantially stationary; the second drive input means causes the transmission means to move the flight control member to the flight control positions when the first drive input means is substantially stationary.

The transmission means comprises the planetary gear means wherein the first drive input means is the ring wheel means and the second drive input means is the sun wheel means. The first drive means is hydraulic drive means, which is operatively connected to a hydraulic fluid supply means, wherein a back driving of the ring wheel means by the planet wheel means is substantially resisted by the hydraulic drive means and the hydraulic supply means. Accordingly, the first drive input means is substantially stationary to enable operation of the secondary drive input means. The planetary gear means reduces a rotational speed of the sun gear means so that a shaft means, which is operatively connected to move the flight control member and which is driven by the planetary gear means has an output rotation which is twenty to eighty times slower than the sun wheel rotation.

A method for selectively causing an aircraft flight control member to assume various flight control positions comprises: providing the hydraulic drive means, and the control valve means; moving the first valve element of the control valve means from an initial position thereof relative to the valve housing of the control valve means to a selected new position in a manner to open a selected port means to cause fluid to flow to the hydraulic drive means and also to establish the selected feedback displacement quantity; displacing the second valve element of the control valve means from an initial position thereof relative to the valve housing means by a function of the displacement of the flight control member from an initial position thereof, whereby the hydraulic drive means acts to move the flight control member by the amount needed so that the flight control member assumes the selected flight control position. The method is characterized in that the selected positions of the first valve element correspond to respective selected positions of the flight control member The rotational input to the first valve control means is a function of the selected feedback displacement quantity.

A method to selectively cause an aircraft flight control member to assume various flight control positions, comprises: providing the transmission means, the first drive means, and the second drive means; engaging the first drive means and the second drive means, respectively, continuously with, respectively, the first drive input means and the second drive input means of the transmission means.

Other features will become apparent from the following detailed description.

BRIEF DESCRIPTION OF THE DRAWINGS

FIGS. 3A–3C are a sequential diagram consisting of columns A through E and rows 1 through 10 and illustrating certain relationships and operation of the components of the present invention, including the following:

Figure 3A:
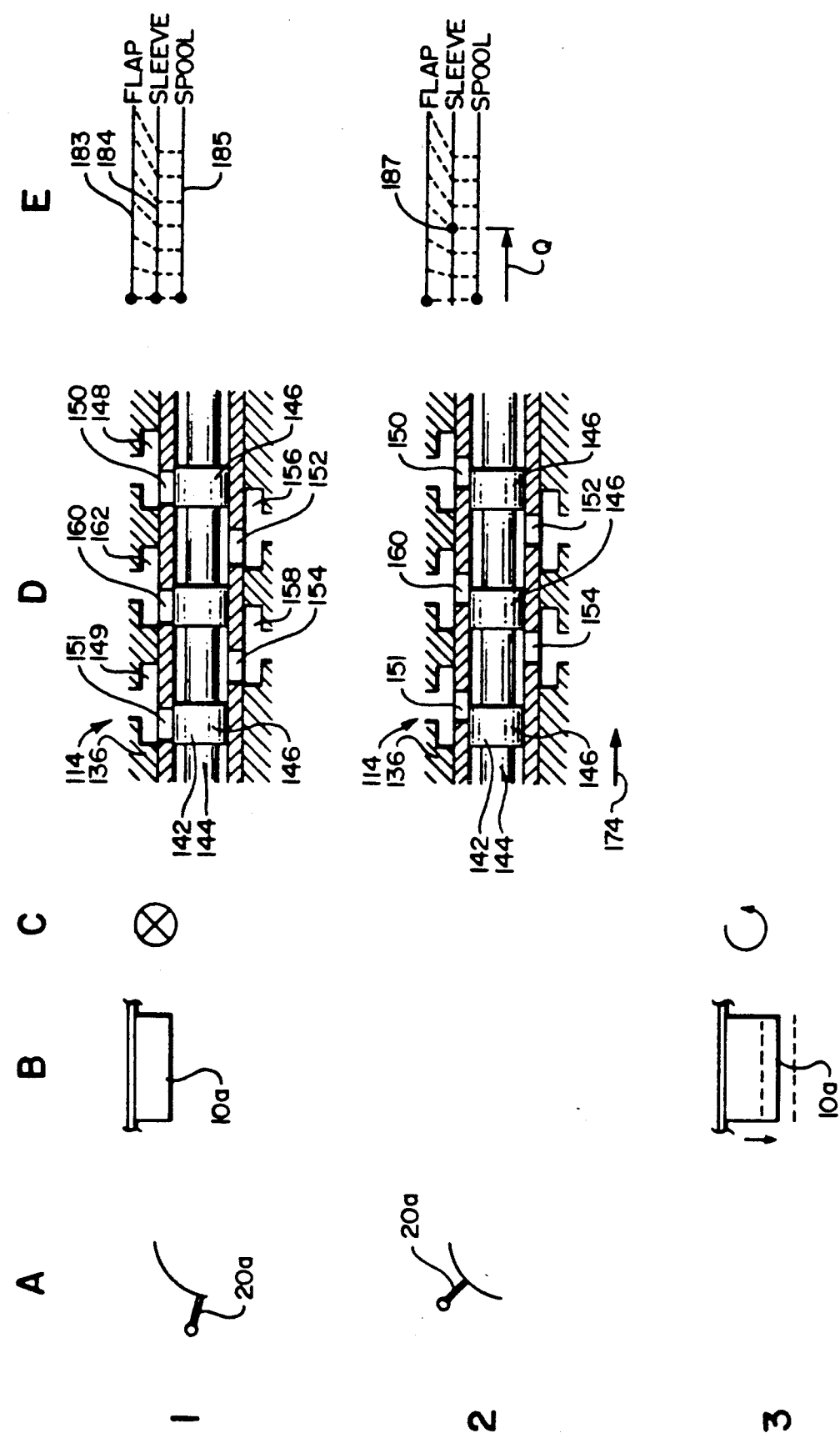
Figure 5:
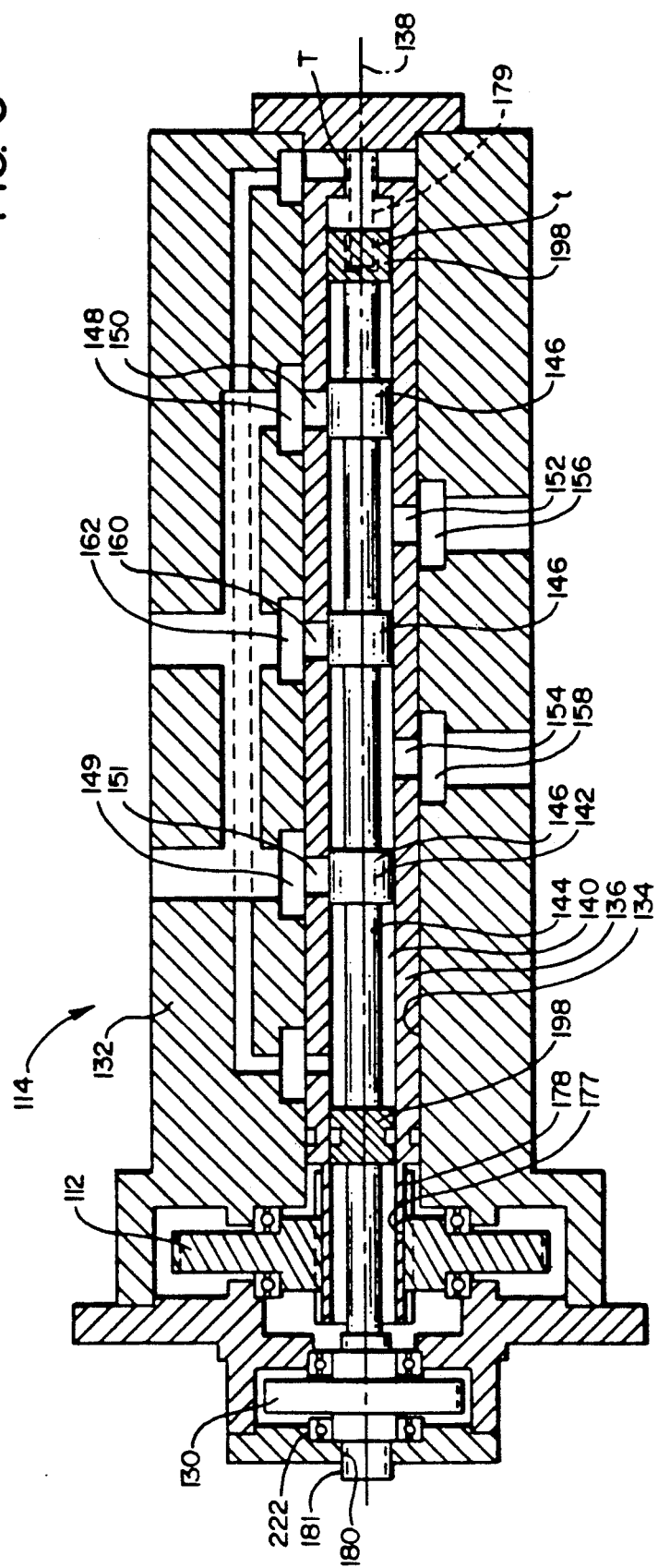
Figure 6:
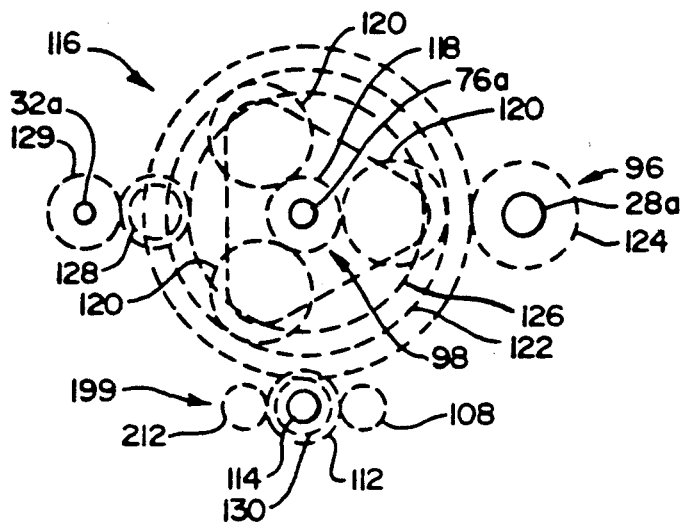
Figure 7:
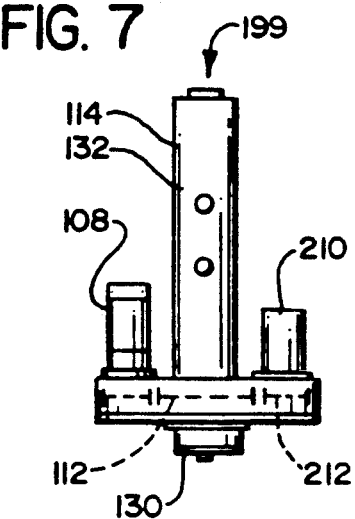
Figure 8:
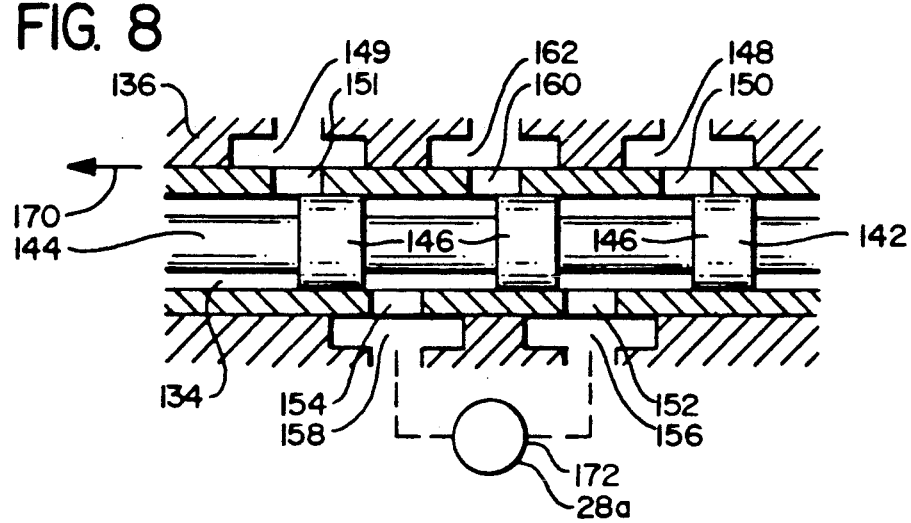
Figure 9:
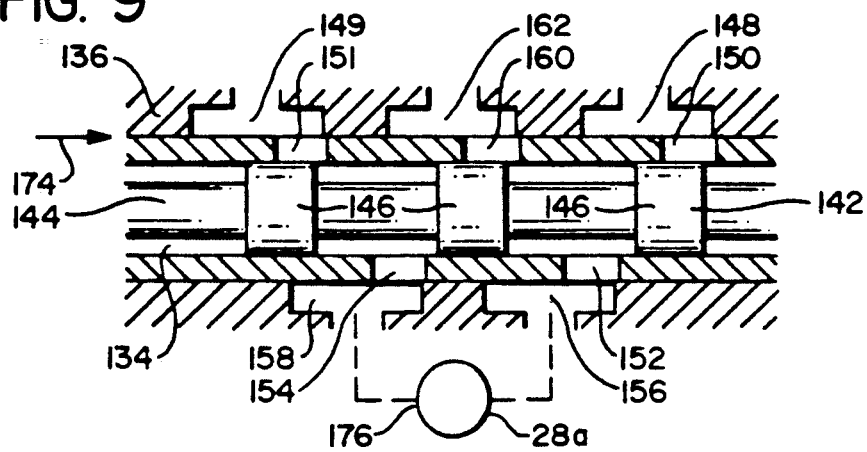

in Column A, various positions of a pilot's lever for controlling a trailing edge flap of the aircraft;

in Column B, shown schematically, various positions of the flap;

in Column C, shown schematically, different conditions of rotation of a hydraulic motor which drives the flap;

in Column D, shown from the side in longitudinal section view, various positions of a spool valve element, a ported moveable sleeve valve, and stationary ports, in a hydraulic control valve of the present invention;

in Column E, shown schematically, certain relationships between the various positions of the flap, the sleeve valve of the control valve, and the spool element of the control valve;

FIGS. 4A–4B are a sequential diagram like FIGS. 3A–3C, with FIGS. 4A–4B illustrating under Columns A, B, C, D, and E, and rows 1 through 7, the same components and general relationships as FIGS. 3A–3C, except with FIGS. 4A–4B showing a second method for moving the spools in relation to the ports within the control valve;

FIG. 5 is a view from the side in longitudinal section of the interior of the control valve of the present invention;

FIG. 6 is a top view of a planetary gear transmission of the present invention;

FIG. 7 is an exterior view from the side of a control valve module of the present invention;

FIG. 8 is a combined schematic illustration of the hydraulic motor of the present invention at the bottom and a longitudinal sectional side view of the ports and valve elements of the control valve at the top with the figure illustrating certain relationships in using a first method of moving the spools relative to the ports;

FIG. 9 is a view like FIG. 8 except illustrating a reverse direction of flow as compared to FIG. 8.

DESCRIPTION OF THE PREFERRED EMBODIMENT

I. Description of the Prior Art System.

It is believed a clearer understanding of the advantages of the present invention will be obtained by first describing the prior art system which is used in present day Boeing 747-400 aircraft, and then providing a detailed description of the present invention.

Figure 1:
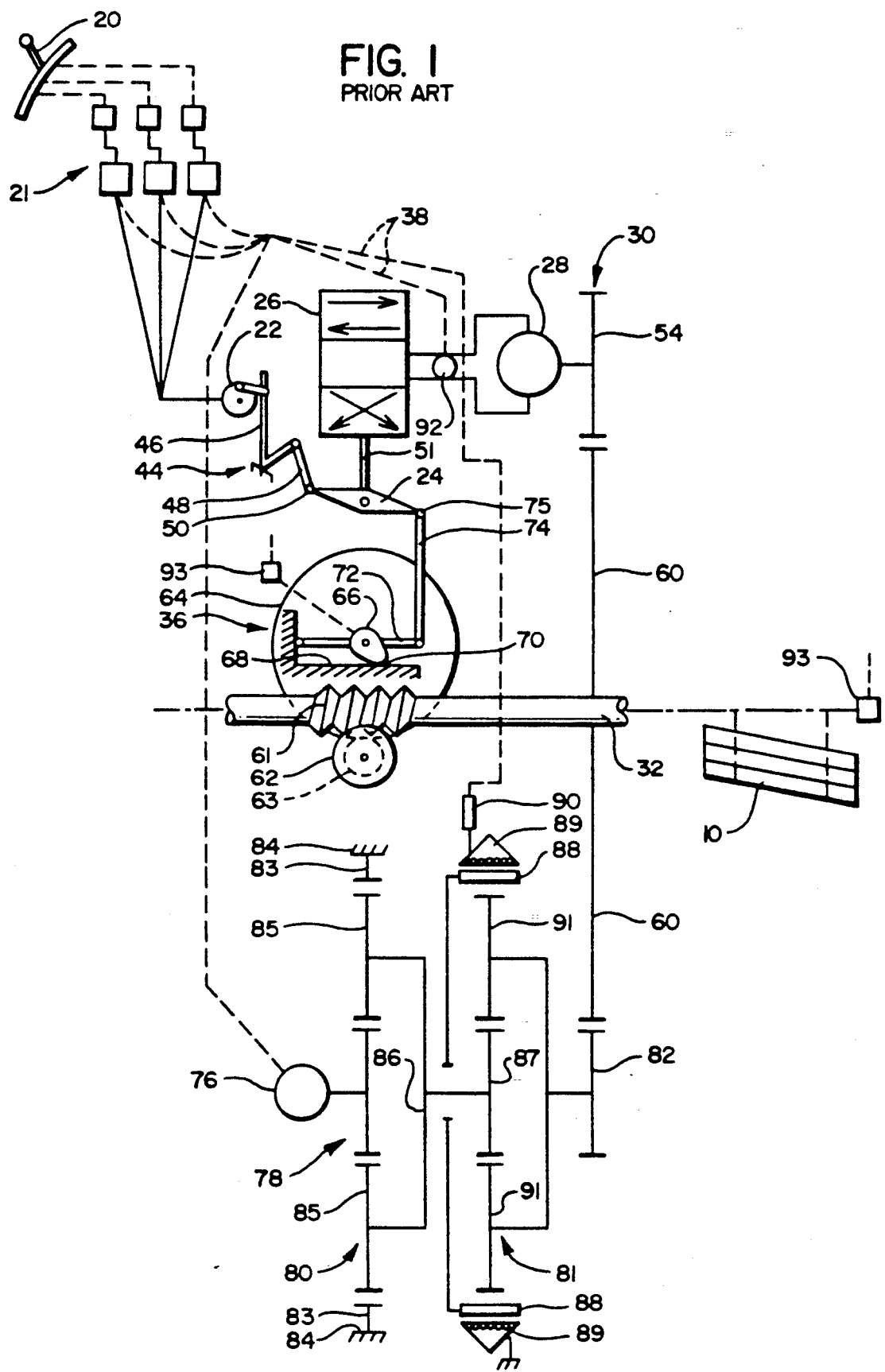
FIG. 1 is a schematic diagram of the components of a prior art aircraft flap control system which is used in present day Boeing 747-400 aircraft.

In a typical aircraft there are control members, such as the trailing edge flaps 10, which move to various flight control positions. The pilot manipulates a pilot's lever 20 in the cockpit to command the positioning of the flaps 10. With reference to FIG. 1, the pilot operated lever 20 which is moved by the pilot to different positions to act through a computer apparatus 21 to provide an input to a control motor 22. This control motor 22 works through a summing lever 24 to operate a main hydraulic control valve 26, which in turn supplies hydraulic fluid to a hydraulic motor 28. This hydraulic motor 28 is in turn attached to a gear system, generally designated 30, to turn a torque tube 32.

The torque tube 32 is in turn connected to a feedback mechanism, generally designated 36, to also operate against the aforementioned summing lever 24 to move the control element of the hydraulic valve 26.

In addition to the computer apparatus 21 providing an output to the motor 22, the computer apparatus 21 provides a second output (indicated by the dotted lines 38) for a fail-safe operation.

When the pilot moves the lever 20 to a certain position to rotate the flaps the desired amount, the movement of the lever 20 provides a signal through the computers 21 to the control motor 22 which in turn acts through a lever system 44 to move a control element of the control valve 26. Specifically, the pilot's signal through the computers 21 and the control motor 22 acts through a bell crank 46, with this bell crank 46 in turn operating through a link 48 to act at the point 50 on the summing lever 24. Connected to the mid-point of the summing lever 24 is a link 51 which in turn is connected to the control element of the valve 26. Movement of the control element of the valve 26 causes the hydraulic fluid to flow in one direction or the other to the aforementioned hydraulic motor 28, which in turn acts through the gear train 30. More specifically, the motor 28 turns a first gear 54 which connects directly to a driver gear 60 that is fixedly attached to the torque tube 32.

As the torque tube 32 rotates to move the flap 10 to the desired position, it rotates a worm gear 61 that is in turn connected to a worm drive gear 62 which is fixedly attached to a worm output gear 63 which in turn rotates a feedback gear 64 having fixedly attached thereto a cam 66. The cam 66 acts against a cam surface 68, so that rotation of the cam 66 which is acting at a point 70, acts on a feedback lever 72 to operate through a link 74 to move a second end point 75 of the summing lever 24 either upwardly or downwardly, depending upon the direction of the rotation of the torque tube 32. As the torque tube 32 continues to rotate, it moves the control element of the valve 26 back to its center position so as to stop further operation of the main hydraulic motor 28.

Let it now be assumed that there is some malfunction with the direct drive to the control motor 22. In this instance, the pilot will initiate the appropriate command to the computers 21 to bring the fail-safe mechanism into play. This fail-safe mechanism comprises a backup motor 76 which in turn operates through speed reducing gear mechanism 78 to cause rotation of the torque tube 32. More specifically, this is a speed reducing gear transmission 78 comprising a first sun gear 79 which rotates a first planetary gear set 80 which rotates a second planetary gear set 81 which in turn rotates an output gear 82 which rotates the driver gear 60 which in turn rotates the torque tube 32 so as to move the flap 10. Specifically, the backup motor 76 rotates the first sun gear 79. A first ring gear 83 is fixedly attached to a housing 84 so that the first ring gear 83 is stationary. The rotation of the first sun gear 79 causes a plurality of planet wheels 85 to revolve around the first sun gear 79 so as to rotate a planet carrier gear 86 which rotates a second sun gear 87. There is a second ring gear 88 which is held stationary by means of a clutch system 89 and a solenoid 90 which will be described shortly. There is a plurality of second planet wheels 91 which are caused to revolve when the second sun gear 87 rotates and provided that the second ring gear 88 is stationary, which causes the output gear 82 to rotate which moves the flaps 10.

When the pilot places the control mechanism in the fail-safe mode, there is a signal which is directed to the solenoid 90 which causes the clutch system 89 to engage with the second ring gear 88 to make the second ring gear 88 stationary. As just described, this enables the driving of the backup motor 76 to drive the revolution of the second planet wheels 91 which moves the flaps 10. (During normal operation, the clutch system 89 is disengaged thereby allowing the second ring gear 88 to rotate. Accordingly, when the hydraulic motor 28 acts to cause the torque tube 32 to rotate, the output gear 82 will in turn rotate and the second planet wheels 91 will revolve around the second sun gear 87. However, because the second ring gear 88 is free to rotate, there is no force transmitted to the second sun gear 87 and therefore the backup motor 76 will be protected from a harmful backdriving in this situation.)

Also, when the pilot places the mechanism in the fail-safe mode, a signal is directed to a by-pass valve 92 so that there is a short circuit of hydraulic fluid from one side of the main hydraulic motor 28 directly to the other.

There are also rotary variable differential transformers 93, which are connected to the end of the torque tube 32 and also to the cam 66 respectively. The rotary variable differential transformers are responsive to the rotation of the torque tube 32 and of the cam 66 and they are in communication via the computer 21 with the crew of the aircraft so as to diagnose the condition of the torque tube 32 and the cam 66.

It is to be noted that in the fail safe mode, the backup motor 76, via the speed reducing gear means 78, drives the torque tube 32 at about one-fifth to one-tenth of the speed under normal operation.

II. Description of the Present Invention in Detail.

A. General Description of the Present Invention

For convenience, items of the present invention which are like items of the prior art system just described will be given like numerical designations with the letter "a" added.

Figure 2:
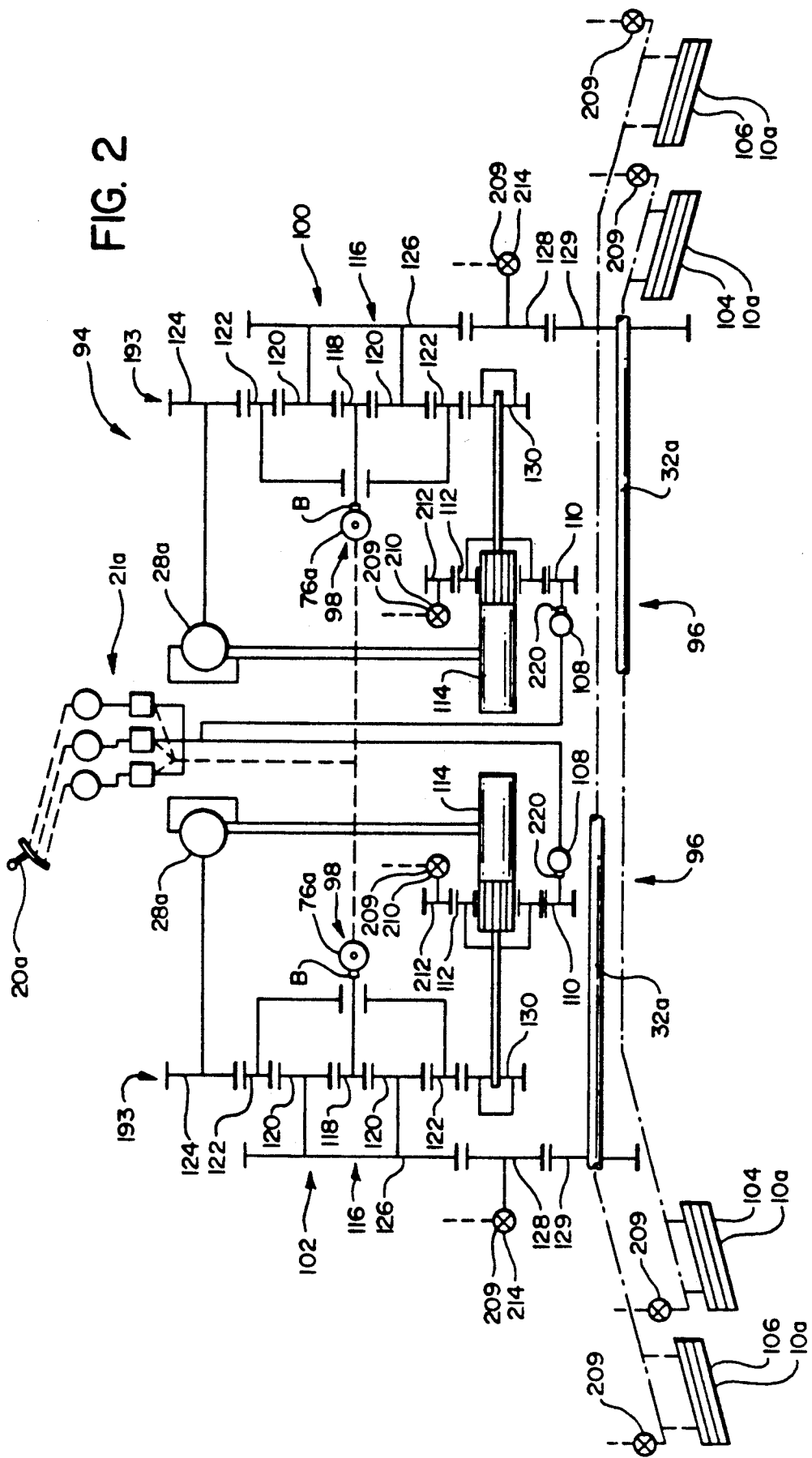
FIG. 2 is a schematic diagram of the components of the system of the present invention.

As in the prior art system, with reference now to the schematic system diagram of FIG. 2, the present invention, which is generally indicated at 94, comprises a main system 96 and a backup system 98 for fail-safe operation. It is to be noted, as will be explained more fully near the end of the specification, that the present invention comprises similar or identical inboard flap operating components 100 and outboard flap operating components 102, respectively, which control, respectively, inboard flaps 104 and outboard flaps 106.

To activate the main system 96, the pilot moves the pilot's lever 20a to different positions thereby acting through the computer apparatus 21a to cause a control motor 108 to turn a gear 110 so as to rotate an input gear 112 which imparts a rotational input to the elements within a control valve 114. The control valve 114 is schematically represented in FIG. 2, and is connected both to a source of hydraulic fluid and to the main hydraulic motor 28a. In response to the rotational input from the control motor 108, the control valve 114 starts and stops the flow of hydraulic fluid to the hydraulic motor 28a. There is a planetary gear set or transmission 116, which comprises a sun gear 118, a plurality of planet wheels 120, which revolve around the sun gear 118, and a ring gear 122 which surrounds and engages the planet wheels 120. The hydraulic motor 28a turns a motor output gear 124 which rotates the ring gear 122, which in turn causes the planet wheels 120 to revolve, in turn causing a planet carrier wheel 126 to turn, thereby turning a connecting gear 128, which in turn rotates a drive gear 129 which is fixedly attached to the torque tube 32a. The torque tube 32a in turn rotates to move the flaps 10a to the desired position.

For feedback, rotation of the ring gear 122 rotates a feedback gear 130 which in turn moves control elements in the control valve 114, thereby providing feedback. These control elements will be described in detail below.

In the event that some component which activates the hydraulic motor 28a fails, the backup system 98 is used. The backup system 98 comprises a backup motor 76a, which directly turns the sun gear 118. During fail-safe operation, for reasons that will be described under the fail-safe operation discussion below, the hydraulic motor 28a holds the ring gear 122 substantially stationary. The turning of the sun gear 118 rotates the planet wheels 120 that in turn rotate the planet carrier wheel 126 which acts to rotate the torque tube 32a and to move the flaps 10a.

During the normal operation of the present invention 94, a brake B holds the sun gear 118 substantially stationary. The sun gear 118 serves as a secondary or backup motor input and the ring gear 122 serves as a primary or hydraulic motor input to the planetary gear set or transmission 116. It is to be understood that the described transmission 116 may be used for other modes of drive means than the hydraulic mode.

B. General Description of the Control Valve and its Operation.

Before turning to a description of the steps which are involved in the normal operation, the control valve 114 will first be described.

Referring now to the side view of FIG. 5, the control valve 114 comprises (i) a valve housing 132 with a cylindrical stationary main chamber 134, (ii) a cylindrical movable sleeve valve 136, which fits slideably within the main chamber 134 to slide axially right and left along a central axis 138 of the main chamber 134, and which has a cylindrical inner chamber 140 concentric with the axis 138, and (iii) a spool valve element 142 that fits slideably within the inner chamber 140 to slide axially along the axis 138. The spool valve element 142 includes an axially extending central shaft portion 144, which is smaller than the inner chamber 140 in diameter so that fluid may flow around the shaft portion 144 and three spools valve portions 146, which are attached fixedly to the central shaft portion 144 at axially spaced locations and which fit slideably in the inner chamber 140. (In referring to the control valve 114, the terms "axial" or "axially" denote an alignment with or movement in a direction along the central axis 138, while the terms "right" and "left" denote the directions right and left in the FIG. 5.)

The valve housing 132 has a number of axially spaced stationary ports, while the sleeve valve 136 has corresponding movable ports which open to the stationary ports so as to permit fluid to flow between the stationary ports and the main chamber 134. In terms of general flow of the fluid, as shown in FIGS. 8 and 9, pressurized fluid from the fluid source moves via one or the other of a right stationary pressure port 148 or a left stationary pressure port 149 and via a related one of a right movable pressure port 150 or a left movable pressure port 151 into the main chamber 134, and then flows from the main chamber 134 through one or the other of a right movable control port 152 or a left movable control port 154 and through a related one of a right stationary control port 156 or a left stationary control port 158 and thence to a flap extending or flap retracting side of the hydraulic motor 28a. The control ports 152, 154, 156 and 158, are located between the right pressure ports (148 and 150) and the left pressure ports (149 and 151). Fluid returns from the hydraulic motor 28a via one or the other of the stationary control ports 156 or 158 and through a related one of the movable control ports 152 or 154 into the main chamber 134, and then flows through a movable return port 160 and through a stationary return port 162 thence to a fluid sump. The return ports 160 and 162 are located between the right control ports (152 and 156) and the left control ports (154 and 158). It is important to note that the five stationary ports 148, 149, 156, 158, and 162, and the five movable ports 150, 151, 152, 154, and 160, have sufficient lengths, in an axial sense, to assure that the stationary ports 148, 149, 156, 158, and 162, communicate continuously with the corresponding movable ports 150, 151, 152, 154, and 160. Also as shown in FIGS. 8 and 9, the three spool valves 146 are spaced axially so that when the spool valve assembly 142 is positioned in a neutral relationship shown in FIG. 5 with respect to the sleeve valve 136, the spool valves 146 block each of the top moveable ports 150, 151, and 160, so that fluid does not flow. It is to be noted that the control valve 114 is oversized so as to accommodate full flow in the hydraulic system until the control valve 114 is very near to closure.

To explain specifically how the control valve 114 acts to cause the hydraulic motor 28a to turn in the manner either to extend the flaps 10a or retract the flaps 10a, first, for flap retraction, when the sleeve valve 136, as shown in FIG. 8, is displaced axially with respect to the spool valve assembly 142 in a flap retracting direction, which is indicated by an arrow 170, the pressurized fluid from the fluid source will flow via the right stationary pressure port 148 through the right movable pressure port 150 through the main chamber 134 through the right movable control port 152 through the right stationary control port 156 thence to a flap retracting side 172 of the motor 28a; the fluid returns from the motor 28a via the left stationary control port 158, the left movable control port 154, the main chamber 134, and then through the movable return port 160, and the stationary return port 162, and thence to the sump. Similarly, flap extension is accomplished, as shown in FIG. 9, by displacing the sleeve valve 136 in an opposing, flap extending direction indicated by an arrow 174 relative to the spool valve assembly 142. In this case, the fluid from the source flows through the left stationary pressure port 149, the left movable pressure port 151, the main chamber 134, the left movable control port 154, the left stationary control port 158, and thence to a flap retracting side 176 of the motor 28a. The fluid returns from the motor 28a through the right stationary control port 156, the right movable control port 152, the main chamber 134, the movable return port 160, the stationary return port 162, and thence to the sump. Thus, in summary, during normal operation of the system, the sleeve valve 136 moves relative to the spool valve assembly 142 in a manner to direct pressurized fluid to the two sides 172 or 176 of the motor 28a.

As earlier mentioned, the control motor 108 (FIG. 2) provides rotational input via the gears 110 and 112 to the control valve 114. The rotation, as shown in FIG. 5, of the input gear 112 rotates an axially disposed first rotatable Acme thread 177. A first axially moveable Acme thread 178 is threadably engaged with the first rotatable thread 177 and is restrained from rotation by fixed attachment to the sleeve valve 136, which in turn is restrained from rotation by axially slideably engagement of a slot (indicated at the right end of the sleeve valve 136 at T) with a stationary, axially disposed anti-rotation spline 179. The rotational input imparted to the first rotatable thread 177 therefore axially drives the sleeve valve 136. The input gear 112, the first rotatable and axially movable threads 177 and 178, and the anti-rotation spline 179, serve as a valve control means which converts the rotational input, which originates from the control motor 108, into the axial motion of the sleeve valve 136 within the valve housing 132.

As also earlier mentioned, the ring gear 122 provides feedback through the feedback gear 130 to the control valve 114. The rotation of the feedback gear 130 rotates a second rotatable Acme thread 180 which drives axially a threadably engaged second axially movable Acme thread 181, which is restrained from rotation by fixed attachment to the spool valve element 142 (in turn restrained from rotation by slideable engagement of a slot indicated at the right end of the spool valve element 142 at t with the anti-rotation spline 179), so as to drive axially the spool valve element 142. The feedback gear 130, the second rotatable and axially movable threads 180 and 181, and the anti-rotation spline 179, are a second valve control means which acts to convert rotational feedback from rotation of the ring gear 122 into the axial motion of the spool valve element 142.

Accordingly, in summary, the axial movement of the sleeve valve 136 relative to the valve housing 32 corresponds to the pilot's input, which indicates the selected flap position; the axial movement of the spool valve elements 142 corresponds to the actual motion of the flaps 10a.

Let it be assumed that, as shown in Row 1 of the operation diagrams of FIGS. 3A–3C (hereafter referred to as FIG. 3) that the flaps 10a (Column B) are in the fully retracted (zero percent extension) position and that the pilot's lever 20a (Column A) is in a corresponding position. As shown under Column D of Row 1, which illustrates the interior of control valve 114, the spool valves 146 are aligned to block the movable pressure ports 150 and 151 and the return port 160 of the sleeve valve 136, so that the control valve 114 keeps the hydraulic motor 28a stationary, as indicated by the "X" on the circular symbol, which is under Column C and which represents the hydraulic motor 28a. The pictured relation of Column D of Row 1 of the spool valve portions 146 to the movable ports 150, 151, 160, at the top of the picture of is an example of the spool valve portions 146 and the sleeve valve 136 being in the neutral relationship where the spool valve portions 146 block the flow of hydraulic fluid.

Preliminarily, it is mentioned that the successive figures going down Column E of FIG. 3 are sequential schematic diagrams wherein a top horizontal line 183 represents the path between the various positions of the flaps 10a, a middle line 184 indicates the path between the positions of the sleeve valve 136 in relation to the valve housing 132, and a bottom line 185 illustrates the path between the positions of the spool valve element 142, also in relation to the valve housing 132. The vertical solid lines represent the various positions along these paths, and the connection of the vertical solid lines by dotted lines illustrates certain positions of the flaps 10a, the sleeve valve 136, and the spool valve element 142, which mutually correspond with one another. For each position of the sleeve valve 136 along its path, there is a corresponding position of the spool valve element 142 along its respective path; and for both of these positions, there is also a corresponding position of the flaps 10a. The dark dots in the diagrams indicate the status of the flaps 10a, the sleeve valves 136 and the spool valve element 142. The diagrams of Column E assume that when the sleeve valve 136 and spool valve element 142 are in their corresponding positions, this means that, as exemplified in the valve picture of Column D of Row 1, that the sleeve valve 136 and the spool valve portions 146 are in their neutral relationship to one another. As pictured in Column E of Row 1, these elements are all in their positions which correspond to the full retraction of the flaps 10a.

Assuming now that the pilot wants to extend the flaps 10a to one of the intermediate flap positions, the pilot will move the lever 20a to a position (shown in Column A of Row 2) which generates a signal causing the control motor 108 (shown in FIG. 2) to cause the rotation of the first rotatable thread 177 to drive the sleeve valve 136 toward a certain one of the sleeve valve positions (represented in Column E of Row 2 at 187) which corresponds to the intermediate flap position selected by the pilot. As shown in the picture in Column D of Row 2, while the sleeve valve 136 assumes its new position the spool valve element 142 momentarily remains at the initial spool valve position of Row 1. At this moment, the sleeve valve element 136 has moved in the flap extending sense (indicated by the arrow 174) in relation to the spool valve assembly 142, with the spool valve portions 146 and the top and bottom movable ports 150, 51, 152, 154 and 160, now being arranged in a manner that fluid is directed to the flap extending side 76 (shown in FIG. 9) of the hydraulic motor 28a. Importantly, the sleeve valve 136 has been displaced in a manner so that the sleeve valve 136 establishes a feedback displacement quantity Q, shown in the schematic diagram of Column E of Row 2. The feedback displace quantity Q is the displacement which the spool valve assembly 142 will need to be displaced, from its initial position relative to the valve housing 132, in order to catch up and realign with the sleeve valve 136.

When the fluid flows to the flap extending side 176 of the motor 28a the motor means 28a turns in a flap extending direction, indicated by the circular arrow under Column C of Row 3, with this rotation causing the flaps 10a to extend toward the desired intermediate position, as shown under Column B. Simultaneously, as the flaps 10a are extending, the turning of the ring gear 122 (shown in FIG. 2) provides the feedback which acts to cause the second rotatable thread 180 (shown in FIG. 5) to drive the spool valve element 142 so as to follow the sleeve valve 136 in the flap extending sense. After continued extension of the flap 10a, the spool valve element 142 catches up with the sleeve valve 136 so that the spool valve portions 146 of the spool valve element 142, as shown under Column D of Row 4, are then positioned in the neutral relationship to the sleeve valve 136 so as to cover the top movable ports 150, 151, and 160, whereby the motor 28a is stopped and the flaps 10a are held in the desired intermediate flap position.

As indicated in the diagram under Column E of Row 4, the sleeve valve 136 and the spool valve element 142 are now in a new aligned position indicated at 188 which corresponds to the selected intermediate position of the flaps 10a. It is apparent that by establishing the selected feedback displacement quantity Q, the sleeve valve 136 has established the basis for starting and stopping the flow of hydraulic fluid to the motor 28a so that the flaps 10a, extend until the flaps 10a assume the desired position. The spool valve element 142 follows the sleeve valve 136 so as to compare the feedback displacement of the spool valve element 142, i.e., the axial feedback provided by the second rotatable thread 180, with the feedback displacement quantity Q. When the feedback displacement of the spool valve assembly equals the feedback quantity Q, the control valve 114 acts to stop the flap 10a. Feedback to the spool valve element 142 could be provided by any means which is responsive to an input which is related to a displacement of the flap 10a in an manner to sense the displacement and to displace the spool valve element 142 by a function of the displacement of the flaps 10a.

As mentioned earlier, during normal operation the brake B hold the sun gear 118, as shown in FIG. 2, substantially stationary, with the brake B making the main system 96 operative. A feature of the invention is that during both the normal operation described in this Section B.1 and during the fail-safe operation described below in Section B.2 the hydraulic motor 28a remains continuously driveably engaged, via the motor output gear 124, with the ring gear 122.

Let us assume that the pilot now desires to extend the flaps 10a to their fully extended position. The procedure is similar to that described above, with a few exceptions. The new initial positions of the sleeve valve 136 and spool valve element 142 are those shown under Columns D and E of Row 4. Again, the sleeve valve 136 moves as pictured in Column D of Row 5, in the flap extending sense (indicated by the arrow 174) in relation to the spool valve element 142. Again, this action directs fluid to the flap extending side 176 of the motor means 28a, initiating the extension of the flaps 10a. The sleeve valve 136 establishes a new feedback displacement quantity Q (shown in Column E of Row 5), but which again equals the displacement by which the spool valve element 142 must be displaced from its initial position (the position of Row 4 of Column E) in order to again realign with the sleeve valve 136. This new realignment will occur when the sleeve valve 136 and the spool valve element 142 are both at certain positions indicated at 190 which correspond to the fully extended position of the flaps 10a. The flaps 10a, as indicated under Column B of Row 7, now extend toward the fully extended position. This movement as shown in Row 7, again acts to cause, via the feedback, the spool valve element 142 to catch up and realign with the sleeve valve 136 in the new realignment position at 190. When this new realignment occurs, the flaps 10a are in the desired fully extended position.

If it is desired to retract the flaps 10a, let us suppose, to the fully retracted position, then the major differences in the procedure include the following. Assuming that the flaps 10a are starting from the fully extended position (as shown in Column B of Row 7), and that the sleeve valve 136 and spool valve element 142 are starting from their corresponding positions, which are pictured in Row 7, the pilot's signal acts to cause the control motor 108 to make the first rotatable thread 177 to displace the sleeve valve 136 in the flap retracting sense (indicated by the arrow 170 in Column D of Row 8) relative to the spool valve element 142. The relative positions of the sleeve valve 136 and the spool valve element 142 now cause the control valve 114 to direct the hydraulic fluid to the flap retracting side 172 (shown in FIG. 8) of the motor 28a. Again, the sleeve valve 136 has been moved to the certain sleeve valve position which corresponds to the desired fully retracted position of the flaps 10a. Again, as indicated in Column E of Row 8, the sleeve valve 136 establishes a new feedback displacement quantity Q, such that the follow-up movement of the spool valve element 142 from the position pictured in Column D of Row 7 to the new realignment position of Column D of Row 10 compares the feedback displacement signal to the feedback displacement quantity Q.

There is a second method which is shown in FIGS. 4A–4B (hereafter referred to as FIG. 4) of moving the spool valve portions 146 in relation to the movable ports 150, 151, 152, 154 and 160. The control valve 114 and all the components described above continue to have the same structure and configuration as described. Referring to the diagrams of FIG. 4, let us first assume that the flaps (shown in Column B of Row 1) are in the fully retracted position, and that the pilot's lever 20a is in its corresponding position, with these positions being identical to those of the flap 10a and lever 20a in Row 1 of FIG. 3. However, the three spool valve portions 146, shown in Column D of Row 1 of FIG. 4, are shifted to the right as compared to the picture in Column D of Row 1 of FIG. 3, so that a middle spool valve portion 146 covers the right movable control port 152 and a left spool valve portion 146 covers the left movable control port 154. This relationship is a modified neutral relationship between the spool valve element 142 and the sleeve valve 136. Unlike the earlier described neutral relationship, exemplified in Column D of Row 1 of FIG. 3, in the modified neutral relationship the bottom movable ports 152 and 154 are covered, while the top movable ports 150, 151, and 160, are open, with the blocking of the ports 152 and 154 stopping the flow of fluid. As in the first method, the status diagram of Column E of Row 1 indicates that the flaps 10a, the sleeve valve 136, and the spool valve element 142 are all in their positions which correspond to full retraction of the flap. Assuming now that the pilot wants to extend the flaps 10a to a certain intermediate position, again the pilot moves the lever 20a to the appropriate position, shown in Column A of Row 2, which acts to cause the first rotatable thread 177 to axially drive the sleeve valve in a flap extending sense, indicated by the arrow 191 (shown in Column D of Row 2), relative to the spool valve element 142, which is the direction opposite to the previously described flap extending direction 174 of the first method. As in the first method, pressurized fluid flows via the movable control port 154 to the flap extending side 176 of the motor 28a. But in this case, the fluid flows, as indicated by the curved arrow in Column D of Row 2), to the left side of the left spool valve portion 146 rather than to the right side of the left spool valve portion 146 as pictured in FIG. 9. Again, as shown in FIG. 4 the movement of the sleeve valve 136 from its initial position to the sleeve valve position which corresponds to the desired flap position establishes a feedback displacement quantity Q shown in Column E of Row 2, with the feedback displacement quantity Q being the distance which the spool valve element 142 must be displaced from its initial position relative to the valve housing 132 in order to catch up with the sleeve valve 136 so as to realign and stop the flow of fluid. This follow-up movement of the spool valves portions 146 is indicated by the new position of the spool valves in Column D of Row 4. At this stage, the flaps 10a, as shown in Column B of Row 4, have reached the desired intermediate position, as is also indicated by the alignment of the dark dots in Column E of Row 4 at the new alignment position, thus indicating that the flaps 10a, the sleeve valve 136, and the spool valve element 142 are realigned in a new neutral relationship. One reason that the spool valve portions 146 may be used both as in the first method, to block the flow by covering the top movable ports 150, 151, and 160, and as in the second method, to block the flow by covering the bottom movable ports 152 and 154, is that the spool valve portions 146 are spaced axially on the central shaft portion 144 by a spacing distance S (shown in Column D of Row 4 of FIG. 4) with the top movable ports 150, 151, and 160, being axially spaced from one another by the same distance S, while the bottom movable ports 152 and 154 are also spaced from one another by the distance S.

Assuming now that the pilot wants to retract the flaps 10a to the fully retracted position, the pilot will move the control lever 20a to the appropriate position, as shown in Column A of Row 5 which results in the sleeve valve 136 being moved in a flap retracting direction, indicated by the arrow 192, relative to the spool valve element 142, sending pressurized fluid, again as in the first method via the movable port 152 to the flap retracting side 172 of the motor 28a. The flap retracting direction 192 is the opposite of the flap retracting direction 170 of the first method. After the sleeve valve 136 reaches the sleeve valve position which corresponds to full retraction of the flaps 10a, thereby setting up the new feedback displacement quantity Q (shown in Column E of Row 5) and after the flaps 10a have retracted thereby acting to cause the feedback means to make the spool valve element 142 catch up with the sleeve valve 136, the valve elements realign in the neutral relation (shown in Row 7) with the flaps 10a being fully retracted and the sleeve valve 136 and with the spool valve element 142 being in their positions which correspond to the full flap retraction.

To summarize, under either the first method or the second method, the sleeve valve 136 moves between a plurality of first valve positions and the spool valve element 142 moves between a plurality of second valve positions along their respective path lines (represented in the diagrams of Column E of both the FIGS. 3 and 4). During the process of input and response, the certain first valve position toward which the sleeve valve 136 is moved, corresponds to the certain flap position, shown along the schematic flap path line 183, which is the flap position that the pilot has selected. The spool valve element 142 is continuously in the certain second valve position which corresponds to the flap's 10a actual position. Thus, when the spool valve element 142 aligns with the sleeve valve 136 so that the spool valve element 142 and the sleeve valve 136 are in their corresponding positions, the flaps 10a are then in the position desired by the pilot. The valve elements compare the actual displacement of the flaps 10a to the displacement which the pilot has selected.

Unlike the prior art system, the hydraulic control valve 114 of the present invention has logic integral with the control valve 114 which is responsive to the primary input from the pilot and responsive to the feedback of the flap position, so as to start and stop the hydraulic fluid to the motor 28a so that the movement of the flaps 10a is started and stopped in a manner to cause the flaps 10a to assume the desired flap position. Inasmuch as the control motor 108 of the present invention provides the rotational input through the input gear 112 to the elements of the control valve 114, the lever system 44 (shown in FIG. 1) is eliminated. The functions of the lever system 44 are performed in the present invention integrally in the control valve 114. Also, the connection of the feedback gearing of the control valve 114 to the input in the planetary gear set 116, i.e., the ring gear 112, eliminates the feedback gearing components 61-75 of the prior art system, and provides a much shorter feedback loop. The feedback may be taken by the control valve 114 from any rotating component within a primary drive train 193 (shown in FIG. 2), which comprises the hydraulic motor 28a, the motor output gear 124, and the ring gear 122. This feedback should be taken as close as possible to the hydraulic motor 28a in order to keep the feedback loop as small as possible.

C. Fail-safe Operation of the System.

As mentioned at the outset in the general description, when the main system 96 fails to position the flaps 10a, the pilot must employ the backup system 98 so that through the computer apparatus 21a (shown in FIG. 2), the pilot directs the backup motor 76a to drive the sun gear 118 which, provided that the ring gear 122 is kept substantially stationary, revolves the planet wheels 120, which act through the gears 126, 128, and 129 to drive the flaps 10a. During this process the hydraulic control valve 114 is closed and the fluid is trapped between the hydraulic motor 28a and the valve 114. The ring gear 122 is held stationary by the engagement of the ring gear 122, via the motor output gear 124, with the inoperative hydraulic motor 28a. The resistance of the hydraulic fluid in the fluid system (to which the hydraulic motor 28a is attached) in effect holds the hydraulic motor 28a stationary. Hence, it is expected that a brake for the hydraulic motor 28a is not required.

The by-pass valve 92 (shown in FIG. 1) of the prior art system is eliminated in the present invention, and there is no longer a requirement, as existed in the prior art system, to send a separate signal to each of the backup motor 76 and the by-pass valve 92. In the present invention, to make the fail-safe system operational, a signal is sent just to the brake B, so as to release the brake B, and to the back-up motor 76a.

To step down the high RPMs of the backup motor means 76a, a stepdown in rotational velocity is achieved by connecting the backup motor 76a through the sun wheel 118, which has a relatively small diameter, to the three planet wheels 122, which have a relatively large combined diameter and which rotate the planet carrier wheel 126. The planet carrier wheel 126 is then geared, through the connecting gear 128 to the driver gear 129 (which is fixedly attached to the torque tube 32a), with the diameters of the planet carrier wheel 126 and the driver gear 129 being appropriately selected to achieve the proper output speed. The speed reducing characteristic of the transmission 116 eliminates the requirement, which existed in the prior art system, for the separate speed reducing gear mechanism 78 (shown in FIG. 1).

To enable the main system 96 and the backup system 98 to be continuously engaged with the transmission 116, the transmission 116, as shown in FIG. 6, in effect has two continuously engagable power inputs: a primary power input, which is provided through the ring gear 122, and a secondary power input, which is provided through the sun gear 118. The transmission 116 is in effect a unified transmission which operates the main system 96 and the backup system 98 and which provides the rotational feedback to the control valve 114.

Other gear arrangements than the planetary gear arrangement shown which have the primary power input, the secondary power input and the feedback to the control valve are possible without departing from the concept described.

C. Further Detailed Description

Having described the major features of the invention, further detailed information will now be provided.

As shown in the side view of FIG. 7, the control motor 108, the valve housing 132, the associated input and feedback gears 112 and 130, and a diagnostic device (to be described below), are all packaged together in a compact valve module 199.

As shown in FIG. 5, right and left ends of the inner chamber 140 of the sleeve valve 136 are sealed by end spools 198 so that the inner chamber 140 properly contains the fluid.

The rotational displacement of the control motor 108, which is activated by the pilot through the computer apparatus 21a, is a function of the feedback displacement quantity Q (which as mentioned establishes the amount of displacement of the flaps 10a). As is apparent, this form of input is relatively simple to provide.

To describe how the planetary gear means 116 provides speed reduction between the hydraulic motor means 28a and the torque tube 32a the hydraulic motor means 28a may operate at approximately 3,000–7,000 RPMs. The hydraulic motor means 28a as shown in FIG. 6 has the motor output gear 124, with a relatively small diameter, which engages the ring gear 112, with a relatively large diameter. (Again, the rotation of the ring gear 122 acts through the planet wheels 120 and subsequent gears 126, 128 and 129 to rotate the torque tube 32a.)

As FIG. 2 indicates and as mentioned at the outset, the computers 21a are connected to two of the control motors 108 and to two of the backup motor means 76a. For separate operation of the inboard flaps 104 and the outboard flaps 106, there are an inboard and outboard primary system 96 and 96, respectively having similar or identical elements, and an inboard and outboard backup system 98 and 98, respectively, which also have identical or similar components. Various modifications to this arrangement may be made, such as sharing of certain components by the inboard and the outboard systems. As an example, the backup motor means 76a for the two systems may comprise a single common backup motor (not shown).

To describe a diagnostic system used in the present invention, absolute position optical encoders 209, which produce an electrical signal in response to a rotation, are placed at various locations in the control system in a manner that (1) there is confirmation to the crew that the proper commands have been sent and (2) jamming or other failure of components may be isolated and diagnosed. As in the prior art, diagnostic sensors are positioned at the end of the torque tube 32a where the flaps 10 are located, so as to diagnose problems with the torque tube 32a. In the present invention, an input sensing absolute position optical encoder 210 is positioned in a manner to monitor the rotational input which is provided by the control motor 114. The input sensing optical encoder 210 has a sensing gear 212 which engages the input gear 112. A drive sensing optical encoder 214 is positioned in a manner that monitors the condition of the components between the motors 28a and 76a and that isolates a breakdown of a component of the drive train. In practice, the drive sensing optical encoder 214 is connected to the gear 128 between the planet gears 120 and the driver gear 129 of the torque tube 32a. The optical encoders 209 are each operatively connected to the onboard computer for communication to the aircraft crew.

The control motor 108 is equipped with a brake 220 so that the sleeve valve 136 may be held stationary.

The feedback gear 130 is mounted upon a suitable gear support bearing 222.

It is to be understood that modifications of the foregoing may be made without departing from the basic teachings of the present invention.

What is claimed is:

1. A control system to selectively cause an aircraft flight control member to assume various flight control positions, said control system comprising:

a. a hydraulic drive means to move said flight control member to said flight control positions;
   b. a control valve means operatively connected to a source of hydraulic fluid and to said hydraulic drive means to selectively direct said hydraulic fluid thereto, said control valve means comprising:
      i. a valve housing means;
      ii. a first valve element moveable relative to said valve housing;
      iii. a second valve element moveable relative to said valve housing, with said first and second valve elements being moveable relative to one another, wherein said first valve element moves from an initial position thereof relative to said valve housing to a selected new position in a manner to open a selected port means to cause fluid to flow to said hydraulic drive means and also to establish a selected feedback displacement quantity, which is a quantity by which said second valve element is to be displaced from an initial position thereof relative to said valve housing in a manner that when said second valve element is displaced by said feedback displacement quantity to a new position, said second valve element closes a selected port means to interrupt fluid flow to said hydraulic drive means;
   c. a first valve control means to move said first valve element relative to said valve housing;
   d. an input means to cause said first valve control means to move said first valve element to said selected positions of said first valve element, with said system being characterized in that said first valve positions correspond to respective selected positions of said flight control member;
   e. a second valve control means to move said second valve element relative to said valve housing and relative to said first valve element;
   f. a sensing and feedback means responsive to an input which is related to a displacement of said flight control member in a manner to sense said member displacement and to cause said second valve control means to displace said second valve element relative to said valve housing by a function of said member displacement, whereby said hydraulic drive means moves said flight control member by an amount needed so that said flight control member assumes said selected flight control positions.

2. The system as recited in claim 1, further comprising:

a. a transmission means operatively connected to displace said flight control member;

b. a secondary drive means which is responsive to a secondary command directed at selectively causing said flight control member to assume said flight control positions;

c. wherein said hydraulic drive means and said secondary drive means, respectively, are continuously engaged driveably with, respectively, a primary drive input means and a secondary drive input means of said transmission means, with said primary drive input means acting through said transmission means to move said flight control member when said secondary drive input means is substantially stationary, with said secondary drive input means acting through said transmission means to move said flight control member when said primary drive input means is substantially stationary, and with a rotation of a component of said transmission means providing a rotational feedback which provides said sensing and feedback means to said second valve control means.

3. The system as recited in claim 1, wherein:

a. said valve housing means has stationary port means, which comprises stationary source port means connected to said source of hydraulic fluid and stationary control port means connected to said hydraulic drive means, with said stationary port means being connected to a stationary chamber of said valve housing means;

b. said first valve element moves within said stationary chamber between said first valve positions along an alignment axis of said stationary chamber;

c. said first valve element has port means which are connected to a chamber of said first valve element and which allow said fluid to pass between said stationary source port means and said first valve chamber and between said first valve chamber and said stationary control port means, whereby said fluid is allowed to flow via said first valve chamber between said source of fluid and said hydraulic drive means;

d. said second valve element comprises spool means for stopping said flow of fluid through said first valve chamber wherein said second valve element moves within said first valve chamber between said second valve positions along said alignment axis to selectively open and close said first valve port means;

e. Whereby, when said first valve element is selectively displaced in a manner to be displaced from said initial position thereof relative to said second valve element, said first valve port means which was previously closed is opened to allow said flow of fluid between said source of fluid and said hydraulic drive means, and when said second valve element is displaced from said initial position thereof by said feedback displacement quantity, said open first valve port means is closed.

4. The system as recited in claim 3, wherein said first valve control means causes said first valve element to move axially in response to a rotational input from rotation of a component of said input means.

5. The system as recited in claim 4, wherein said first valve control means comprises:

a. an input wheel means to which is imparted said rotational input;

b. a rotatable thread means which is fixedly attached to said input wheel means, with said rotatable thread means and said input wheel means being rotatably mounted about an input rotation axis;

c. an axially movable thread means, which is threadably engaged with said rotatable thread means;

d. an anti-rotation means connected to said axially movable thread means so as to cause said axially movable thread means to move along said input rotation axis when said rotatable thread means is rotated, with said axially movable thread means being connected to said first valve element so as to drive said first valve element along said alignment axis.

6. The system as recited in claim 4, wherein said second valve control means causes said second valve element to move axially in response to a rotational feedback from rotation of said sensing and feedback means; wherein said first valve control means has a central opening; wherein a connecting means connects said second valve control means to said second valve element through said opening, whereby said second valve control means causes said connecting means to drive said second valve element axially.

7. The system as recited in claim 3, wherein said second valve control means causes said second valve element to move axially in response to a rotational feedback from rotation of said sensing and feedback means; wherein said second valve control means comprises:

a. a feedback wheel means to which is imparted said rotational feedback;

b. a rotatable thread means fixedly attached to said feedback wheel means, with said rotatable thread means and said feedback wheel means being mounted for rotation about a feedback rotation axis;

c. an axially movable thread means, which is threadably engaged with said rotatable thread means;

d. an anti-rotation means which is operatively connected to said axially movable thread means so as to cause said axially movable thread means to move along said feedback rotation axis when said rotatable thread means rotates, with said axially movable thread means being connected to said second valve element so as to drive said second valve element axially along said alignment axis.

8. The system as recited in claim 1, wherein said system further comprises a primary drive train means, which comprises said hydraulic drive means and a transmission means operatively connected to said hydraulic drive means for moving said flight control member to said flight control positions; wherein a rotation of a component of said primary drive train means imparts a rotational feedback to said second valve control means, whereby said second valve control means causes said second valve element to be displaced between said second valve positions relative to said valve housing means by a function of said flight control member displacement.

9. The system as recited in claim 8, wherein said transmission means comprises: a motor output wheel means which is driven by said hydraulic drive means; and a planetary gear means comprising; (i) a ring wheel means, which is rotated by a rotation of said motor output wheel means; (ii) a plurality of planet wheel means, which are surrounded by said ring wheel means; and (iii) a sun wheel means, around which said planet wheel means revolve; wherein a rotation of said ring wheel means causes said planet wheel means to revolve around said sun wheel means which revolution acts to move said flight control member to said flight control positions, with said rotation of said ring wheel means acting to provide said rotational feedback to said second valve control means.

10. The system as recited in claim 8, wherein:
a. said valve housing means has stationary port means, which comprises stationary source port means connected to said source of hydraulic fluid and stationary control port means connected to said hydraulic drive means, with said stationary port means being connected to a stationary chamber of said valve housing means;
b. said first valve element moves within said stationary chamber between said first valve positions along an alignment axis of said stationary chamber;
c. said first valve element has port means which are connected to a chamber of said first valve element and which allow said fluid to pass between said stationary source port means and said first valve chamber and between said first valve camber and said stationary control port means, whereby said fluid is allowed to flow via said first valve chamber between said source of fluid and said hydraulic drive means;
d. said second valve element comprises spool means for stopping said flow of fluid through said first valve chamber wherein said second valve element moves within said first valve chamber between said second valve positions along said alignment axis to selectively open and close said first valve port means;
e. Whereby, when said first valve element is selectively displaced in a manner to be displaced from said initial position thereof relative to said second valve element, said first valve port means which was previously closed is opened to allow said flow of fluid between said source of fluid and said hydraulic drive means, and when said second valve element is displaced from said initial position thereof by said feedback displacement quantity, said open first valve port means is closed.

11. The system as recited in claim 10, wherein said first valve control means causes said first valve element to move axially in response to a rotational input from rotation of a component of said input means.

12. The system as recited in claim 10, wherein said transmission means comprises: motor output wheel means which is driven by said hydraulic drive means; and a planetary gear means, comprising; (i) a ring wheel means, which is rotated by a rotation of said motor output wheel means; (ii) a plurality of planet wheel means, which are surrounded by said ring wheel means; and (iii) a sun wheel means, around which said planet wheel means revolve; wherein a rotation of said ring wheel means causes said planet wheel means to revolve around said sun wheel means which revolution acts to move said flight control member to said flight control positions, with said rotation of said ring wheel means acting to provide said rotational feedback to said second valve control 13. A control system to selectively cause an aircraft flight control member to assume various flight control positions, said system comprising:
a. a transmission means operatively connected to said flight control member to move said flight control member to said flight control positions;
b. a first drive means which is responsive to a first command directed at selectively causing said flight control member to assume said flight control positions;
c. a second drive means which is responsive to a second command directed at selectively causing said flight control member to assume said flight control positions;
d. said system being characterized in that said first drive means and said second drive means, respectively, are continuously engaged with said transmission means so as to operate, respectively, a first drive input means and a second drive input means of said transmission means, with said first drive input means causing said transmission means to move said flight control member to said selected flight control positions when said second drive input means is substantially stationary, and with said second drive input means causing said transmission means to move said flight control member to said flight control positions when said first drive input means is substantially stationary.

14. The system as recited in claim 13, wherein said transmission means comprises a planetary gear means comprising:
a. said first drive input means which is a ring wheel means;
b. a plurality of planet wheel means, which are surrounded by said ring wheel means; and
c. said second drive input means which is a sun wheel means, around which said planet wheel means revolve; with said revolution of said planet wheel means rotating a planet carrier wheel means; wherein said rotation of said planet carrier wheel means causes said flight control member to move to said flight control positions.

15. The system as recited in claim 14, wherein said first drive means is responsive to said first command by means of a mechanical logic means which is directed at causing said flight control member to assume said selected flight control position and which is responsive to a rotational feedback which is imparted by said planetary gear means to said mechanical logic means.

16. The system as recited in claim 14, wherein said first drive means is hydraulic drive means, which is operatively connected to an hydraulic fluid supply means, wherein a back driving of said hydraulic drive means by said transmission means is substantially resisted by resistance of said hydraulic drive means and said hydraulic fluid supply means, whereby said first drive input means is substantially stationary so as to enable operation of said transmission means through said second drive input means.

17. The system as recited in claim 16, wherein said hydraulic drive means is responsive to said first command by means of a hydraulic control valve drive means which has logic which is directed at causing said flight control member to assume said selected flight control position and which is responsive to a rotational feedback which is imparted by said planetary gear means to control elements of said control valve means..

18. The system as recited in claim 16, wherein said planetary gear means reduces a rotational speed of said sun gear means so that a shaft means, which is operatively connected to move said flight control member and which is driven by said rotation of said planet carrier wheel means, has an output rotation which is 20 to 80 times slower than said sun wheel rotation.

19. The system as recited in claim 14, wherein said planetary gear means reduces a rotational speed of said sun gear means so that a shaft means, which is operatively connected to move said flight control member and which is driven by rotation of said planet carrier wheel means, has an output rotation which is twenty to eighty times slower than said sun wheel rotation.

20. A method for selectively causing an aircraft flight control member to assume various flight control positions, said method comprising:
   a. providing hydraulic drive means to move said flight control member to said flight control positions, and a control valve means operatively connected to a source of hydraulic fluid and to said hydraulic drive means to selectively direct said hydraulic fluid thereto, with said control valve means comprising:
      i. a valve housing means;
      ii. a first valve element movable relative to said valve housing;
      iii. a second valve element movable relative to said valve housing, with said first and second valve elements being movable relative to one another;
   b. moving said first valve element from an initial position thereof relative to said valve housing means to a selected new position in a manner to open a selected port means to cause fluid to flow to said hydraulic drive means and also to establish a selected feedback displacement quantity, which is a quantity by which said second valve element is to be displaced from an initial position thereof relative to said valve housing in a manner that when said second valve element is displaced by said feedback displacement quantity to a new position, said second valve element closes a selected port means to interrupt fluid flow to said hydraulic drive means;
   c. displacing said second valve element from an initial position thereof relative to said valve housing means by a function of a displacement of said flight control member from an initial position thereof, whereby said hydraulic drive means acts to move said flight control member by an amount needed so that said flight control member assumes said selected flight control positions;
   d. said method being characterized in that said selected positions of said first valve element correspond to respective selected positions of said flight control member.

21. The method as recited in claim 20, further comprising:
   a. providing a transmission means operatively connected to displace said flight control member to said flight control positions, and a secondary drive means which is responsive to a secondary command directed at selectively causing said flight control member to assume said flight control positions;
   b. continuously engaging said hydraulic drive means and said secondary drive means, respectively, with, respectively, a primary drive input means and a secondary drive input means of said transmission means in a manner that said primary drive input means acts to cause said transmission means to move said flight control element when said secondary drive input means is substantially stationary, and that said secondary drive input means acts to cause said transmission means to move said flight control member when said primary drive input means is substantially stationary.

22. The method as recited in claim 20, further comprising:
   a. providing first and second valve control means, respectively, which, respectively, are operatively connected with said first valve element and said second valve element, respectively, so as to move said first valve element and said second valve element, respectively, along an alignment axis between said respective first and second valve positions;
   b. driving said first valve element axially in response to a rotational input which is imparted to said first valve control means.

23. The method as recited in claim 22, further comprising moving said second valve element axially between said second valve positions in response to a rotational feedback which is provided to said second valve control means and which is a function of said displacement of said flight control member.

24. The method as recited in claim 23, wherein said rotational input is a function of said selected feedback displacement quantity.

25. The method as recited in claim 24, wherein
   a. said valve housing means has stationary port means, which comprises stationary source port means connected to said source of hydraulic fluid and stationary control port means connected to said hydraulic drive means, with said stationary port means being connected to a stationary chamber of said valve housing mean;
   b. said first valve element moves within said stationary chamber means between said first valve positions along an alignment axis of said stationary chamber;
   c. said first valve element has port means which are connected to a chamber of said first valve element and which allows said fluid to pass between said stationary port means and said first valve chamber and between said stationary control port means, whereby fluid is allowed to flow via said first valve chamber between said source and said hydraulic drive means;
   d. said second valve element comprises full means for stopping said flow of fluid through said first valve chamber wherein said second valve element moves within said first valve chamber between said second valve positions along said alignment axis to selectively open and close said first valve port means;
   e. said first valve port means comprises pressure port means and control port means;
   f. whereby, when said valve element is selectively displaced in the manner to be displaced from said initial position thereof and to be displaced relative to said second valve element, a selected one of a group comprising said control port means and said pressure port means, which was previously closed, is open to allow said flow of fluid between said source and said hydraulic drive means, and when second valve element is displaced from said initial position thereof by said feedback displacement quantity, said selected one of said group of port means is closed.

26. A method to selectively control an aircraft flight control member to assume various flight control positions, comprising:
   a. providing: a transmission means operatively connected to said flight control member to move said flight control member to said flight control positions; a first drive means which is responsive to a first command directed at selectively causing said flight control member to assume said flight control positions; and a second drive means which is responsive to a second command directed at selectively causing said flight control member to assume said flight control positions;

b. engaging said first drive means and said second drive means, respectively, continuously with, respectively, a first drive input means and a second drive input means of said transmission means, with said first drive input means causing said transmission means to move said flight control member to said selected flight control positions when said second drive input means is substantially stationary, and with said second drive input means causing said transmission means to move said flight control member to said flight control positions when said first drive input means is substantially stationary.

27. A control system for controlling an aircraft flight control member, comprising:
a control valve operatively connected to a fluid source having a valve housing and first and second valve elements movable relative to the housing and each other;
a fluid motor operatively connected to the control valve and having a motor rotational output;
a control motor for moving the first valve element relative to the valve housing and second valve element to allow fluid to flow from a fluid source into the fluid motor to turn the motor rotational output;
a transmission having a rotational input operatively connected to the motor rotational output, a transmission rotational output, and a feedback rotational output;
means for moving the flight control member in response to the transmission rotational output; and
feedback means for moving the second valve element relative to the valve housing and the first valve element according to the rotation of the feedback rotational output to prevent fluid from flowing from the fluid source through the control valve to the fluid motor when the flight control member has moved into a desired flight control position.

28. The control system of claim 27, in which the transmission comprises a planetary gear system, where the planetary gear system has a back-up rotational input operatively connected to a sun gear thereof.

29. The control system of claim 28, in which the planetary gear system further comprises a plurality of planetary gears engaged with the sun gear, a ring gear engaged around the planetary gears, a planetary carrier gear which is connected to the planetary gears and which rotates about an axis of the sum gear with the planetary gears, a drive gear engaged with the ring gear, and a feedback gear engaged with the ring gear, where the rotational input turns the driving gear, the planet carrier wheel turns the transmission rotational output, and the feedback gear turns the feedback rotational output.

30. The control system of claim 27, in which:
the fluid motor has first and second motor ports where fluid flowing into the first motor port causes the motor rotational output to rotate in a first direction and fluid flowing into the second motor port causes the motor rotational output to rotate in a second direction;
the valve housing has first through fifth housing ports, where the first and second housing ports are operatively connected to the fluid source, the third housing port is operatively connected to a fluid reservoir, and the fourth and fifth housing output ports are operatively connected to the first and second motor ports, respectively:
the first valve element has first through fifth element ports; and
the first valve element has first through third sealing means for selectively sealing the first through third element ports, respectively, when aligned therewith; whereby
the control motor moves the first valve element in a first axial direction to allow fluid to flow from the fluid source, through the first housing port, the first element port, the fourth element port, and the fourth housing port to the first motor port and from the second motor port through the fifth housing output port, the fifth element port, the third element port, and the third housing port to the fluid reservoir;
the control motor moves the first valve element in a second axial direction to allow fluid to flow from the fluid source, through the second housing port, the second element port, the fifth element port, and the fifth housing port to the second motor port and from the first motor port through the fourth housing output port, the fourth element port, the third element port, and the third housing port to the fluid reservoir; and
the feedback means moves the second valve element such that the first through third sealing means are aligned with the first through third element ports when the flight control member is in the desired flight control position.

* * * * *